(12) United States Patent
Vignesh R

(10) Patent No.: US 10,275,339 B2
(45) Date of Patent: Apr. 30, 2019

(54) ACCESSIBILITY TESTING SOFTWARE AUTOMATION TOOL

(71) Applicant: SAP SE, Walldorf (DE)

(72) Inventor: Jai Vignesh R, Chennai (IN)

(73) Assignee: SAP SE, Walldorf (DE)

( * ) Notice: Subject to any disclaimer, the term of this patent is extended or adjusted under 35 U.S.C. 154(b) by 0 days.

(21) Appl. No.: 15/668,722

(22) Filed: Aug. 4, 2017

(65) Prior Publication Data
US 2019/0042397 A1   Feb. 7, 2019

(51) Int. Cl.
G06F 9/44       (2018.01)
G06F 11/36      (2006.01)
G06N 20/00      (2019.01)
G06F 3/0481     (2013.01)

(52) U.S. Cl.
CPC ...... *G06F 11/3664* (2013.01); *G06F 11/3688* (2013.01); *G06F 11/3696* (2013.01); *G06N 20/00* (2019.01); *G06F 3/0481* (2013.01)

(58) Field of Classification Search
CPC ............ G06F 11/3664; G06F 11/3688; G06F 11/3696
USPC ......................................................... 717/125
See application file for complete search history.

(56) References Cited

U.S. PATENT DOCUMENTS

| | | | | |
|---|---|---|---|---|
| 8,522,083 | B1* | 8/2013 | Cohen ................ | G06F 11/3672 714/38.1 |
| 9,811,248 | B1* | 11/2017 | Berg .................. | G06F 11/3664 |
| 2005/0234680 | A1* | 10/2005 | Dettinger ............ | G06F 17/2705 702/182 |
| 2010/0199215 | A1* | 8/2010 | Seymour .............. | G06F 3/0481 715/808 |
| 2010/0325615 | A1* | 12/2010 | Ramot ................ | G06F 11/3672 717/124 |
| 2012/0124559 | A1* | 5/2012 | Kondur ............... | G06F 8/41 717/125 |
| 2012/0324424 | A1* | 12/2012 | Breeds ............... | G06F 11/3676 717/110 |
| 2015/0199256 | A1* | 7/2015 | Michelsen .......... | G06F 11/3466 717/126 |
| 2015/0347284 | A1* | 12/2015 | Hey .................... | G06F 11/3692 717/125 |

(Continued)

OTHER PUBLICATIONS

Eric Eggert, Shadi Abou-Zahra; Web Accessibility Evaluation Tools List; Mar. 2016; p. 1-50; MA; USA (https://www.w3.org/WAI/ER/tools/).

*Primary Examiner* — Chameli Das
(74) *Attorney, Agent, or Firm* — Buckley, Maschoff & Talwalkar LLC

(57) ABSTRACT

Accessibility testing is initiated on UI elements rendered in a web browser. The UI elements are associated with a web application. A document object model (DOM) corresponding to the UI elements is retrieved. The DOM corresponding to the UI elements is parsed to retrieve properties associated with the UI elements. Accessibility testing is performed on the UI elements by applying accessibility rules on the UI elements. Images of one or more UI elements are captured from among the UI elements. The accessibility test is performed on the images by applying accessibility rules on the images in an image-processing unit. A result of the accessibility testing is recorded in a file. The result of the accessibility testing is displayed in runtime of the web application in the web browser.

14 Claims, 12 Drawing Sheets

(56) References Cited

U.S. PATENT DOCUMENTS

| | | | |
|---|---|---|---|
| 2016/0103566 A1* | 4/2016 | Haas | G06F 3/122 |
| | | | 715/738 |
| 2016/0196021 A1* | 7/2016 | Rahulkrishna | G06F 11/3688 |
| | | | 715/760 |
| 2018/0018254 A1* | 1/2018 | Bansal | G06F 11/3684 |

* cited by examiner

```
<!DOCTYPE HTML>
<HEAD>...</HEAD>
<BODY CLASS="ABCUIBODY ABCUSHELLFULLHEIGHT ABCUSIZECOMPACT" ROLE="APPLICATION" STYLE="HEIGHT: 100%;"> == $0
  <DIV CLASS="ABC-UI-STATIC" STYLE="HEIGHT: 0PX; WIDTH: 0PX; OVERFLOW: HIDDEN; FLOAT: LEFT;" DATA-ABC-UI-AREA="ABC-UI-STATIC">...</DIV>
  <DIV ID="ABCUSHELLFIORIZLOADINGDIALOG" STYLE="Z-INDEX: 8;VISIBILITY: VISIBLE;" CLASS="ABCUSHELLHIDDEN">...</DIV>
  <BUTTON ID="APPLICATION-ACTION-SMMESSAGEFLOWMONITORING-COMPONENT--FLOWGROUP--ADVANCEDFILTERBAR-BTNGO" DATA-ABC-IF="APPLICATION-ACTION-SMMESSAGEFLOWMONITORING-COMPONENT--FLOWGROUP--ADVANCEDFILTERBAR-BTNGO" ARIA-DESCRIBEDBY="__TEXT0" CLASS="ABCMBARCHILD ABCMBTN ABCMBTNBASE ABCMBTNINVERTED">
    <SPAN ID="APPLICATION-ACTION-SMMESSAGEFLOWMONITORING-COMPONENT--FLOWGROUP--ADVANCEDFILTERBAR-BTNGO-INNER" CLASS="ABCMBTNEMPHASIZED ABCMBTNHOVERABLE ABCMBTNINNER ABCMBTNTEXT ABCMFOCUSABLE">
      <SPAN CLASS="ABCMBTNCONTENT" ID="APPLICATION-ACTION-SMMESSAGEFLOWMONITORING-COMPONENT--FLOWGROUP--ADVANCEDFILTERBAR-BTNGO-CONTENT">GO</SPAN> == $0
    </SPAN>
  </BUTTON>
  ...
  <DIV ID="ABCUSHELLFIORIZLOADINGAREA" CLASS="ABCUSHELLFIORIZLOADINGDIALOGAREA" STYLE="HEIGHT: 0PX; WIDTH: 0PX">...</DIV>
</BODY>
</HTML>
```

FIG. 3

| UI ELEMENT TYPE 402 | UI ELEMENT ID 404 | ACCESSIBILITY RULE 406 | RESULT 408 | SOLUTION 414 |
|---|---|---|---|---|
| BUTTON | APPLICATION-ACTION-SMMESSAGEFLOWMONITORING-COMPONENT--FLOWGROUP--ADVANCEDFILTERBAR-BTNGO | LABELS | FAIL | SOLUTION A |
| BUTTON | APPLICATION-ACTION-SMMESSAGEFLOWMONITORING-COMPONENT--FLOWGROUP--ADVANCEDFILTERBAR-BTNA | LABELS | FAIL | SOLUTION E |
| BUTTON | APPLICATION-ACTION-SMMESSAGEFLOWMONITORING-COMPONENT--FLOWGROUP--ADVANCEDFILTERBAR-BTNB | LABELS | PASS | |
| LABEL | APPLICATION-ACTION-SMMESSAGEFLOWMONITORING-COMPONENT--FLOWGROUP--ADVANCEDFILTERBAR-LBLGO | LABELS | PASS | |
| LABEL | APPLICATION-ACTION-SMMESSAGEFLOWMONITORING-COMPONENT--FLOWGROUP--ADVANCEDFILTERBAR-LBLA | LABELS | FAIL | SOLUTION R |
| LABEL | APPLICATION-ACTION-SMMESSAGEFLOWMONITORING-COMPONENT--FLOWGROUP--ADVANCEDFILTERBAR-LBLB | LABELS | PASS | |
| ICON | APPLICATION-ACTION-SMMESSAGEFLOWMONITORING-COMPONENT--FLOWGROUP--ADVANCEDFILTERBAR-ICONGO | LABELS | PASS | |
| ICON | APPLICATION-ACTION-SMMESSAGEFLOWMONITORING-COMPONENT--FLOWGROUP--ADVANCEDFILTERBAR-ICONA | LABELS | FAIL | SOLUTION M |
| ICON | APPLICATION-ACTION-SMMESSAGEFLOWMONITORING-COMPONENT--FLOWGROUP--ADVANCEDFILTERBAR-ICONB | LABELS | PASS | |

AUTOMATION UNIT 401    IMAGE PROCESSING UNIT 400
410 →
412 →

FIG. 4A

| UI ELEMENT TYPE 422 | UI ELEMENT ID 424 | ACCESSIBILITY RULE 426 | RESULT 428 | SOLUTION 430 |
|---|---|---|---|---|
| BUTTON | APPLICATION-ACTION-SMMESSAGEFLOWMONITORING-COMPONENT---FLOWGROUP---ADVANCEDFILTERBAR-BTNGO | COLOR CONTRAST | FAIL | SOLUTION B |
| BUTTON | APPLICATION-ACTION-SMMESSAGEFLOWMONITORING-COMPONENT---FLOWGROUP---ADVANCEDFILTERBAR-BTNA | COLOR CONTRAST | FAIL | SOLUTION C |
| BUTTON | APPLICATION-ACTION-SMMESSAGEFLOWMONITORING-COMPONENT---FLOWGROUP---ADVANCEDFILTERBAR-BTNB | COLOR CONTRAST | PASS | |
| LABEL | APPLICATION-ACTION-SMMESSAGEFLOWMONITORING-COMPONENT---FLOWGROUP---ADVANCEDFILTERBAR-LBLGO | VISIBLE FOCUS | PASS | |
| LABEL | APPLICATION-ACTION-SMMESSAGEFLOWMONITORING-COMPONENT---FLOWGROUP---ADVANCEDFILTERBAR-LBLA | VISIBLE FOCUS | FAIL | SOLUTION D |
| LABEL | APPLICATION-ACTION-SMMESSAGEFLOWMONITORING-COMPONENT---FLOWGROUP---ADVANCEDFILTERBAR-LBLB | VISIBLE FOCUS | PASS | |
| ICON | APPLICATION-ACTION-SMMESSAGEFLOWMONITORING-COMPONENT---FLOWGROUP---ADVANCEDFILTERBAR-ICONGO | COLOR CONTRAST | PASS | |
| ICON | APPLICATION-ACTION-SMMESSAGEFLOWMONITORING-COMPONENT---FLOWGROUP---ADVANCEDFILTERBAR-ICONA | COLOR CONTRAST | FAIL | SOLUTION E |
| ICON | APPLICATION-ACTION-SMMESSAGEFLOWMONITORING-COMPONENT---FLOWGROUP---ADVANCEDFILTERBAR-ICONB | COLOR CONTRAST | PASS | |

432 →

400

| AUTOMATION UNIT | IMAGE PROCESSING UNIT 431 | ⊕ |

FIG. 4B

| AUTOMATION REPORT | | | | |
|---|---|---|---|---|
| FIRST TAB 501 | SECOND TAB 503 | | | |
| UI ELEMENT TYPE | UI ELEMENT ID | ACCESSIBILITY RULE | RESULT | |
| BUTTON 502 | ID LINK 1 504 | LABELS 506 | FAIL SOLUTION A 508 | |
| BUTTON | ID LINK 2 | LABELS | PASS | |
| IMAGE | ID LINK 3 | COLOR CONTRAST | FAIL SOLUTION B | |
| IMAGE | ID LINK 4 | VISIBLE FOCUS | FAIL SOLUTION D | |
| BUTTON | ID LINK 5 | LABELS | PASS | |
| BUTTON | ID LINK 6 | LABELS | PASS | |

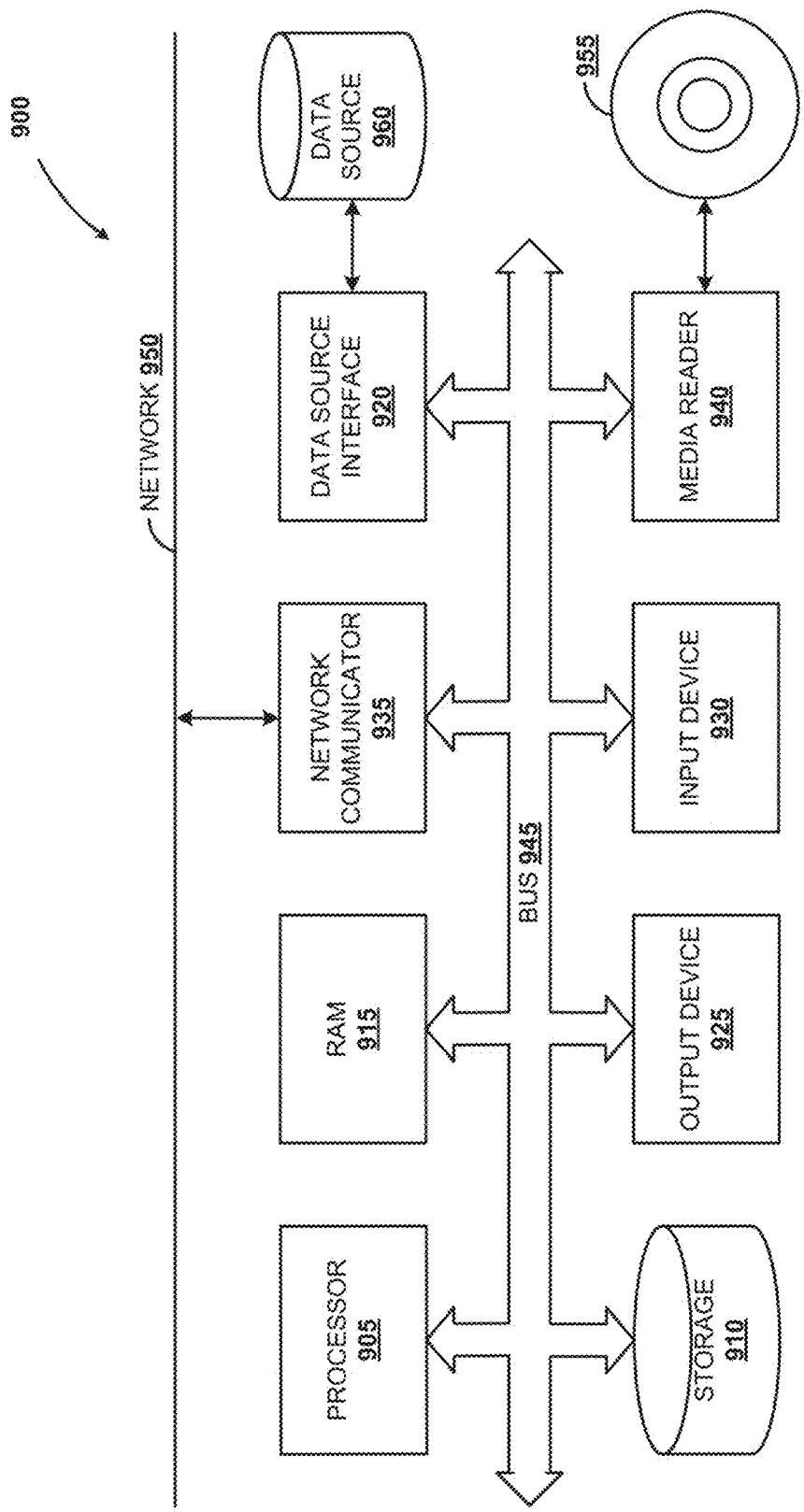

ACCESSIBILITY TESTING SOFTWARE AUTOMATION TOOL

FIELD

Illustrated embodiments generally relate to data processing, and more particularly to accessibility testing software automation tool.

BACKGROUND

In software development, accessibility is an important parameter to be considered. Accessibility refers to the possibility of different people, including people with disabilities, to access and use software products. Accessibility also includes user experience/usability factors such as self-descriptiveness, consistent user interface, appropriate color contrast, etc. There are various assistive tools or technologies such as screen reader software, magnification software, special keyboards, etc., enabling accessibility testing. The individual tools provide specific assistive functionality in a specific environment or specific content.

Often, there is lack of awareness among designers and developers to remember various accessibility rules and perform the accessibility tests corresponding to the accessibility rules. Typically, the accessibility tests are performed at the end of user interface development cycle. It is challenging to develop an accessibility testing tool that not only provides a consolidated functionality of individual assistive tools to perform complete accessibility testing, but also is technology agnostic. It is challenging to integrate the accessibility testing with the development life cycle.

BRIEF DESCRIPTION OF THE DRAWINGS

The claims set forth the embodiments with particularity. The embodiments are illustrated by way of examples and not by way of limitation in the figures of the accompanying drawings in which like references indicate similar elements. Various embodiments, together with their advantages, may be best understood from the following detailed description taken in conjunction with the accompanying drawings.

FIG. 3 shows a source code illustrating document object model of a web page, according to one embodiment.

FIG. 4A shows result of accessibility test in a first tab in a file, according to one embodiment.

FIG. 4B shows result of accessibility testing in a second tab in a file performed in an image-processing unit, according to one embodiment.

FIG. 5B shows a report generated based on results of accessibility test performed by an image processing unit, according to one embodiment.

FIG. 9 is a block diagram of an exemplary computer system, according to one embodiment.

DETAILED DESCRIPTION

Embodiments of techniques of data processing for accessibility testing software automation tool are described herein. In the following description, numerous specific details are set forth to provide a thorough understanding of the embodiments. A person of ordinary skill in the relevant art will recognize, however, that the embodiments can be practiced without one or more of the specific details, or with other methods, components, materials, etc. In some instances, well-known structures, materials, or operations are not shown or described in detail.

Reference throughout this specification to "one embodiment", "this embodiment" and similar phrases, means that a particular feature, structure, or characteristic described in connection with the embodiment is included in at least one of the one or more embodiments. Thus, the appearances of these phrases in various places throughout this specification are not necessarily all referring to the same embodiment. Furthermore, the particular features, structures, or characteristics may be combined in any suitable manner in one or more embodiments.

Figure 1:
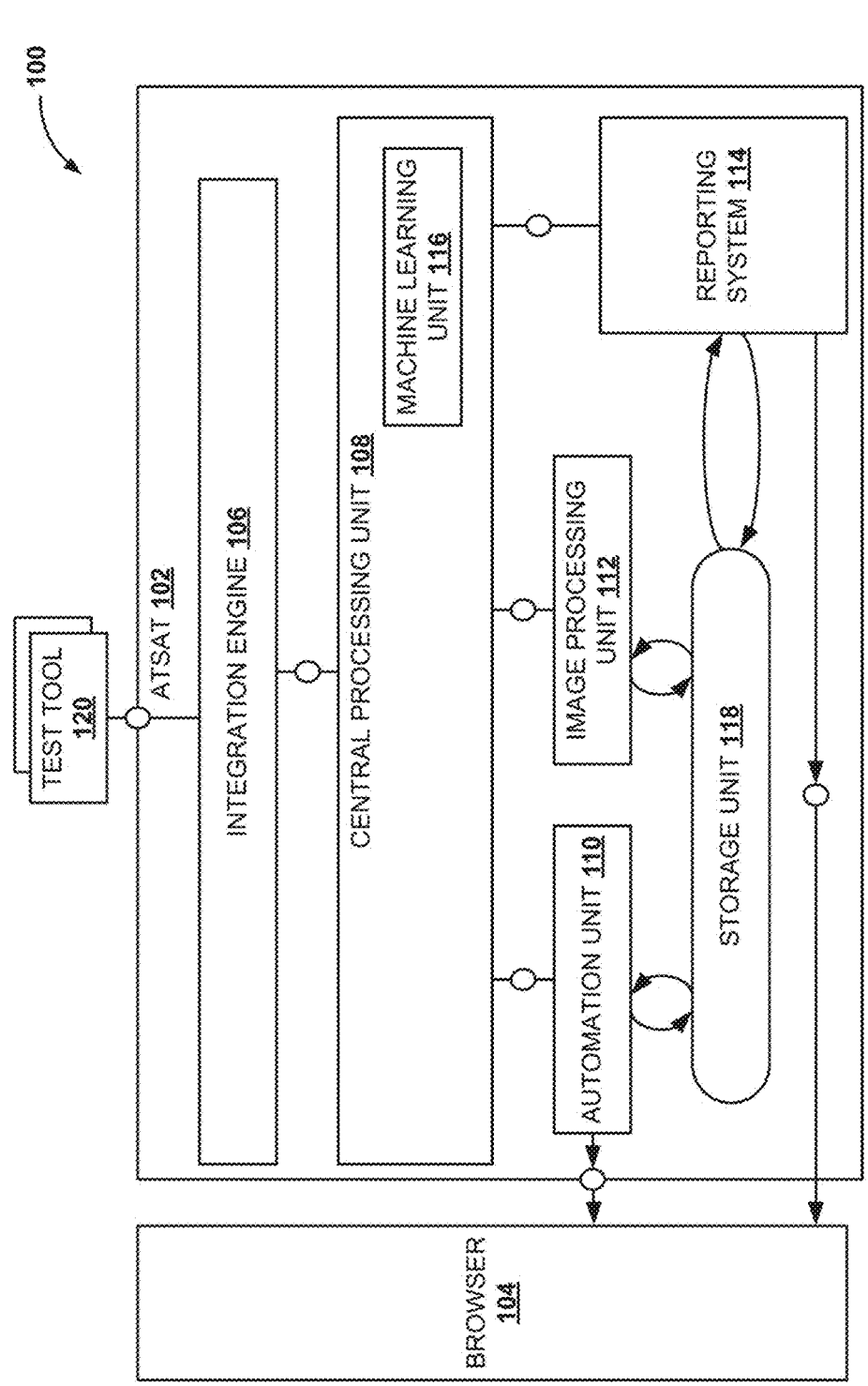
FIG. 1 is a block diagram illustrating architecture of accessibility testing software automation tool, according to one embodiment.

FIG. 1 is block diagram illustrating architecture 100 of accessibility testing software automation tool, according to one embodiment. Accessibility testing software automation tool (ATSAT) 102 is a software tool or a plugin that can be integrated with browser 104 using integration engine 106 or a plugin that can be integrated with development environments such as Eclipse®. For example, a webpage associated with a web application may be rendered in a web browser, for example, Chrome®, etc. The webpage may have various user interface (UI) elements such as a window, button, text box, radio button, menu, popup screen, context menu, widget, icon, pointer, cursor, selection, handle, text cursor, magnifier, etc. The UI elements in the webpage may be tested according to various accessibility guidelines or rules such as text alternative, color and contrast setting, visible focus, etc. The accessibility testing is performed on the UI elements in the webpage, with the accessibility rules as a reference. ATSAT 102 integrated with the browser 104 is used to test the UI elements in the browser web page for accessibility rules.

Central processing unit 108 maintains synchronization between automation unit 110, image processing unit 112 and reporting system 114. The central processing unit 108 also contains machine learning unit 116. The central processing unit 108 initiates a function or process in the automation unit 110. The automation unit 110 interacts with the browser 104 and obtains document object model (DOM) reference for the webpage. DOM is an application-programming interface (API) for hypertext markup language (HTML) and extensible markup language (XML) documents. DOM defines the logical structure of documents and the way the documents are accessed and manipulated.

The automation unit 110 reads DOM elements, and identifies a set of UI elements in the webpage for which accessibility rules can be applied, and second set of UI elements for which screenshot can be captured and image-processing may be performed. In some cases, the two sets of UI elements may overlap. The automation unit 110 analyzes properties of the set of UI element to perform accessibility testing based on the accessibility rules. The result of performing accessibility testing is recorded in a file such as excel file. The recording may be in other file formats such as text file, Adobe® portable document format (PDF) file, etc. The automation unit 110 generates the file and stores information such as UI element type, identifier (ID) of the UI element, accessibility rule and the result of accessibility testing for that UI element. The file is generated with result of accessibility testing and stored in the storage unit 118. For example, an UI element button may be tested for an accessibility rule such as text alternative, where a text alternative is displayed for the UI element button. If properties of the UI element button meet the accessibility rule text alternative, it is inferred that the UI element button has passed the accessibility rule text alternative. If properties of the UI element button do not meet the accessibility rule text alternative, it is inferred that the UI element button has failed the accessibility rule text alternative. The result of accessibility testing of the UI element button is recorded in the file. Various accessibility rules that may be applied on the UI elements are shown in table A below:

TABLE A

Labels
Screen Titles
Accessible alternatives
Minimum contrast
Color and contrast setting
Language attributes
Consistent navigation
Visible focus
Tab/reading order
Error prevention
Correct error handling
Time limits
Embedded or external applications
Animation, audio and video control
Avoidance of flickering and flashing content The machine learning unit 116 in the central processing unit 108 uses machine-learning algorithms for image processing. For example, the accessibility tests may fail for some UI elements, and solutions for the failed UI elements may be provided from a knowledge repository. The knowledge repository may be integrated with the central processing unit 108 or may be accessed by the central processing unit 108. An existing knowledge repository may include the list of accessibility rules that have failed along with solutions to overcome the failed accessibility rules. For example, for the UI element button that has failed the accessibility test, the existing knowledge repository may include a solution to overcome or fix that accessibility test. For example, a knowledge repository with various accessibility rules that may fail along with solution are shown in table B below:

TABLE B

| | |
|---|---|
| Labels | Labels guideline Failed. Provide visible, clear and accurate labels for data input/output fields |
| Screen Titles | Screen titles guideline failed. Provide visible title that describes topic and purpose of the screen |
| Accessible alternatives | Accessible alternatives failed. Provide alternative accessible solution for the control. |
| Minimum contrast | Minimum contrast guideline failed. Check if the foreground color and background color have a minimum contrast ratio of 4:5:1 |
| Color and contrast setting | Color and contrast setting guideline failed. Ensure that at least one high contrast theme is available for selection in your application environment. |

TABLE B-continued

| | |
|---|---|
| Language attributes | Language attributes guideline failed. Label the text content correctly to be identified by assistive technologies. |
| Consistent navigation | Consistent navigation guideline failed. Repeated navigation areas are to be arranged in same location and consistent order across screens. |
| Visible focus | Visible focus guideline failed. Try using margin property/padding property or decorative property for icons. |
| Tab/reading order | Tab/reading order guideline failed. Use form and panel controls for maintaining correct tab order. Ensure UI controls receive reading focus in order. |
| Error prevention | Error prevention guideline failed. Provide provision for user to review, correct or cancel input. |
| Correct error handling | Correct error handling guideline failed. Indicate location of the error, provide a description of the error and suggestions for correction. |
| Time limits | Time limits guideline failed. Inform user on the time limits, and provide options to switch off, delay and extend before the time limit expires |
| Embedded or external applications | Embedded or external applications guideline failed. Provide access or accessible alternative to the embedded or external application. |
| Animation, audio and video control | Animation, audio and video control guideline failed. Provide automatic animations, video and audio stream with pause, stop or hidden volume control. |
| Avoidance of flickering and flashing content | Avoidance of flickering and flashing content guideline failed. Avoid using GIFs. |

The automation unit 110 captures images/screen shots of the second set of UI elements and stores them in storage unit 118. The image processing unit 112 pre-processes the captured images/screen shots, and performs accessibility tests on the captured images with the help of machine learning unit 116. The result of performing accessibility test is recorded in the file. The result of accessibility testing from the image processing unit 112 is stored in the storage unit 118.

The central processing unit 108 initiates processing of the reporting system 114. The reporting system 114 reads the files stored in the storage unit 118. The file stored in the storage unit 118 is consolidated by the reporting system 114 along with the accessibility test results from the automation unit 110, and the accessibility test results from the image processing unit 112. The reporting system 114 sends the consolidated file to the central processing unit 108 containing the machine learning unit 116 to provide solutions for the failed accessibility tests. The reporting system 114 further generates a graphical representation of a report, and displays it in the browser, e.g., in HTML format. When a user clicks on a hyperlink ID in the report, corresponding UI element is highlighted in the webpage launched in a window, and a solution is retrieved from the file and displayed in a proximity to the UI element in the webpage. The ATSAT 102 may be integrated with test tool 120. The test tool 120 may be automation software testing tool, or manual software testing tool. The test tool 120 helps navigate through the web application pages and capture the UI elements to perform the accessibility testing. In one such embodiment, captured images and/or screenshots are later displayed to a user testing accessibility while indicating an identified accessibility issue, and providing one or more potential solutions to accessibility testing.

Figure 2:
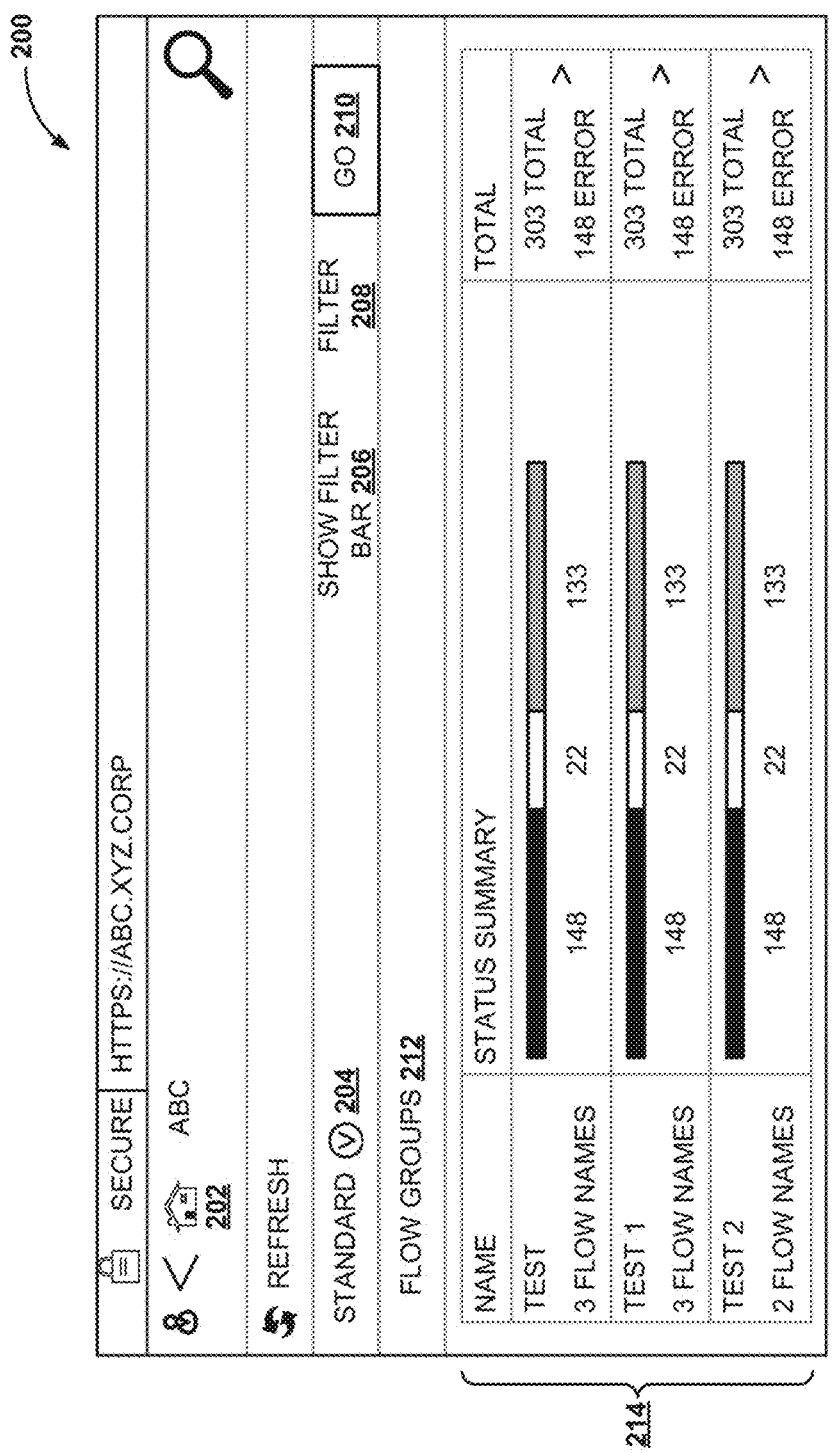
FIG. 2 shows a user interface associated with a web page, according to one embodiment.
Figure 5A:
FIG. 5A shows a report generated based on results of accessibility test, according to one embodiment.
Figure 6:
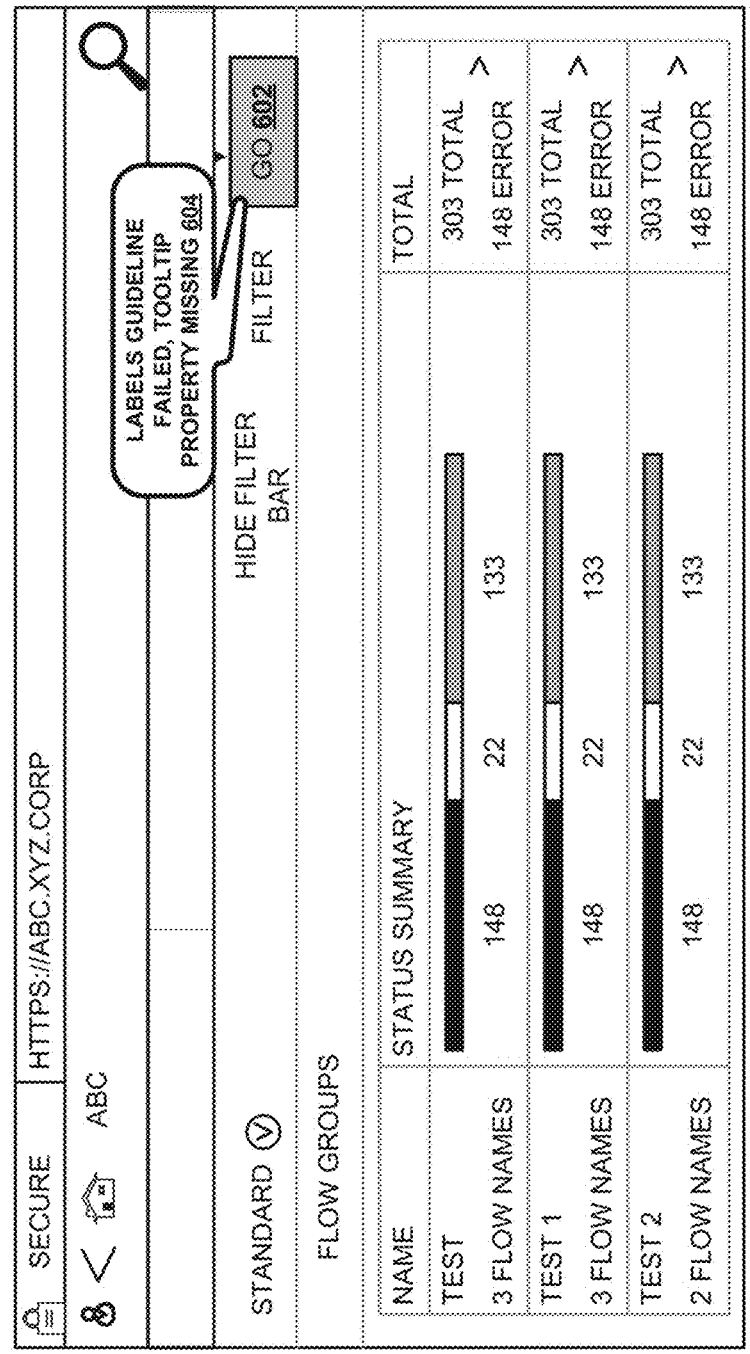
FIG. 6 shows a user interface with results of accessibility test displayed, according to one embodiment.

FIG. 2 shows user interface 200 associated with a web page, according to one embodiment. The user interface 200 associated with the web page of a web application is displayed in a browser. ATSAT is provided as a plugin that is integrated with browser using integration engine. Various UI elements in the web page are 'home' button 202, 'standard' tab 204, 'show filter bar' link 206, 'filter' link 208, 'go' button 210, 'flow groups' label 212, table 214, etc. Accessibility testing may be performed on these UI elements based on accessibility rules or guidelines as explained in FIG. 4A and FIG. 4B. An automation unit may select relevant UI elements and accessibility testing may be performed on them using the accessibility rules, while the automation unit may select second set of UI elements to capture images or screenshots for those UI elements. In some cases the UI elements selected by the automation unit for performing accessibility testing and capturing images may overlap. Accessibility rules may be applied on the captured images in an image-processing unit. After performing accessibility testing, the result of the test is generated as a report as shown in FIG. 5A and FIG. 5B. For example, the UI elements that fail the accessibility test are provided in the report together with suggested solutions as shown in FIG. 5B, and one of the solution 508 in FIG. 5B is displayed in the webpage as shown in FIG. 6.

FIG. 3 shows source code 300 illustrating document object model of a web page, according to one embodiment. Automation unit interacts with a browser and obtains document object model (DOM) reference for the webpage. For example, the source code 300 represents the DOM of the webpage 200 in of FIG. 2 is shown in 300. In DOM, the HTML webpage is represented as a tree structure where each a node in the document is an object representing a UI element of the web page in the document. The different objects have corresponding properties and methods associated with them. An individual node i.e., e.g., an individual object, may be expanded to analyze its properties further. For example, section 302 shows the DOM associated with the object with reference to UI element 'go' button 210 in FIG. 2 referred to as an object, section 302 shows the DOM associated with the object. The automation unit parses the DOM and checks for relevant properties in the DOM corresponding to the object 'go' button. To perform accessibility testing, an accessibility rule such as 'labels' may be used. Here, the automation unit checks for 'title' property in the DOM corresponding to the 'go' button, which corresponds to a 'tooltip' property of the button. The automation unit checks and identifies that 'title' property is not found in the DOM, and hence it is determined that the 'labels' accessibility test fails for the object 'go' button. A result of the accessibility test is stored in a file.

FIG. 4A shows result of accessibility test of automation unit in a first tab or section 401 in file 400, according to one embodiment. Results of accessibility testing may be recorded in a single file in various tabs or sections, or in multiple files. As illustrated, file 400 stores the result of execution of accessibility testing performed on the webpage associated with the UI illustrated in FIG. 2. The result of the accessibility testing is stored in the file 400 with details such as UI element type 402, identifier (ID) of the UI element 404, accessibility rule 406 and the result 408 of accessibility testing for that UI element. For example, the result of accessibility testing, for the 'go' button explained with reference to FIG. 3 is stored in the file 400 in row 410. Row 410 shows UI element type as 'button', identifier (ID) of the UI element 'application-action-smmessageflowmonitoring-component-flowgroup-advancedfilterbar-btngo', accessibility rule 'labels', and the result of accessibility testing as 'fail' for that UI element. The file 400 also has results of execution of accessibility tests performed for other UI elements in the webpage. For example, row 412 shows result of execution of accessibility test for the UI element 'icon A'. The individual accessibility rule is applied to individual UI elements in the web page, and the results of the accessibility test are stored in the file 400. For example, for the UI element 'go' button, the central processing unit provides 'solution A', and the solution is stored in a field in solution column 414. For example, the solution A may be a text content such as 'labels guideline failed, tooltip property missing'. This solution may be stored in the solution column 414. This solution may be associated with a hyperlink in a report. When the hyperlink is clicked, the solution 'labels guideline failed, tooltip property missing' is displayed in a popup window in the webpage in a proximity to the UI element 'go' button. For example, for a failed accessibility rule visible focus, solution provided may be 'visible focus guideline failed, try using margin property/padding property'. Similarly, for a failed accessibility rule 'tab/reading order', solution provided may be 'tab/reading order guideline failed, use form and panel controls for maintaining correct tab order'.

Figure 4C:
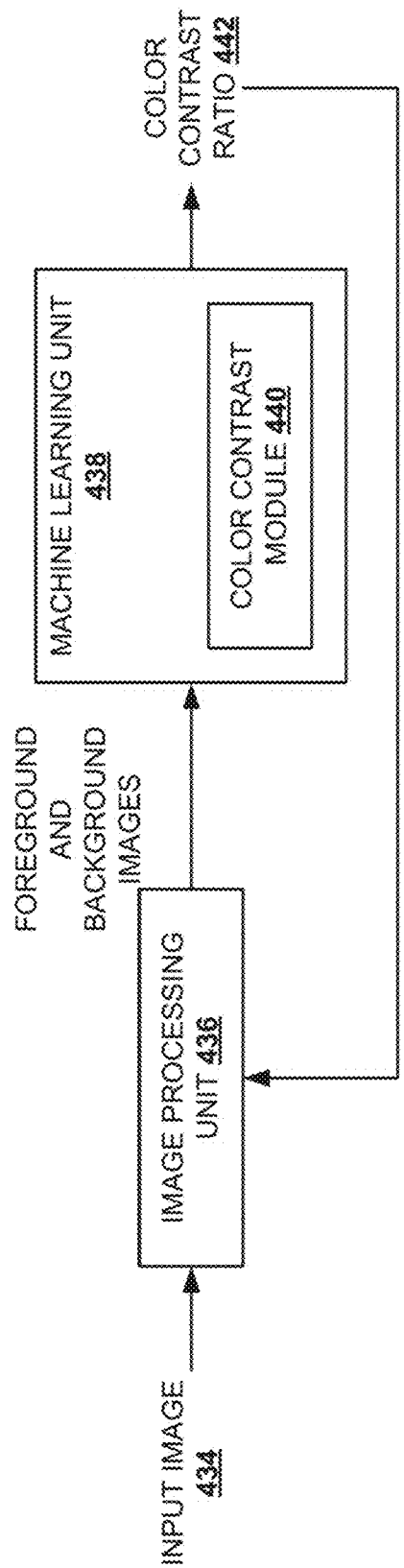
FIG. 4C shows a block diagram illustrating functionality of an image processing unit and machine learning unit, according to one embodiment.

FIG. 4B shows result of accessibility testing of image processing in a second tab or section 431 in file 400 performed in an image-processing unit, according to one embodiment. The captured images of the UI elements are stored in a storage unit as explained in FIG. 2. The stored images are retrieved and processed by the image-processing unit. The image processing unit performs pre-processing of the images to ensure that the images are converted to a standard format for further processing. For example, the image processing unit may pre-process an image to standardize the size of the image. The image-processing unit performs accessibility tests on the captured images. The accessibility tests are based on certain accessibility rules. The result of accessibility testing performed by the image-processing unit is recorded in the second tab in the file 400. The result of the accessibility test is stored in the second tab in the file 400 with details such as UI element type 422, identifier (ID) of the UI element 424, accessibility rule 426 and the result 428 of accessibility testing for that UI element. For example, for the image of the button, result of the accessibility test is stored in file as UI element type 'button', identifier (ID) of the UI element 'application-action-smmessageflowmonitoring-component-flowgroup-advancedfilterbar-btngo', accessibility rule 'color contrast' and result of the accessibility test 'fail' as shown in row 432. The second tab of the file 400 also has results of execution of accessibility testing performed on all the captured images of UI elements in the webpage. The image-processing unit uses machine-learning unit in the central processing unit to analyze the images. The functionality of the image processing unit and the machine learning unit is explained in FIG. 4C. FIG. 4C shows block diagrams illustrating functionality of the image processing unit and the machine learning unit. The machine learning unit is in a central processing unit as shown in FIG. 1. The image of button referred to as input image 434 is provided to image processing unit 436. The image processing unit 436 pre-processes the input image 434 to standardize the image. The image processing unit 436 extracts a foreground image and a background image. The machine learning unit 438 processes the foreground image and the background image to retrieve RGB values of the foreground and background images. The machine learning unit 438 may have various image processing modules/algorithms. Color contrast module 440 in the machine learning unit 438 processes the RGB values of the foreground and the background images and determines a color contrast ratio 442 for the input image. The determined color contrast ratio 442 is provided to the image processing unit 436 to execute accessibility test and determine the result of the test. For example, for the UI element 'go' button, the image processing unit 436 provides 'solution B', and the result is stored in a field in result column 428. The central processing unit receives the consolidated file 400 and provides solutions to the accessibility tests that have failed.

FIG. 5A shows report 500 generated based on results of accessibility test, according to one embodiment. File 400 show in FIGS. 4A and 4B includes consolidated results of the accessibility testing on UI elements in a webpage. The report 500 is a visual representation of the consolidated results recorded in the file 400. The report 500 shows various statistics associated with the accessibility testing. Various statistics associated with the accessibility testing are total tests '60', test view i.e., '40' tests passed and '20' tests failed, time taken for the test '0h 02m07 s', start date and time '2017-02-13 14:05:20', end date and time '2017-02-13 16:07:27', environment 'windows 8.3', pass percentage '67%', etc. The above statistics are displayed in first tab 501 of the report 500.

FIG. 5B shows report 500 generated based on results of accessibility test performed by an image-processing unit, according to one embodiment. File 400 shown in FIGS. 4A and 4B includes consolidated results of the accessibility testing on UI elements in a webpage. The report 500 in FIG. 5B shows a visual representation of the consolidated results recorded in the file 400 in second tab 503. The report 500 shows various statistics associated with the accessibility testing such as UI element type 'button' 502, link to UI element 504, UI element 'go' 506 and result of the accessibility test 'fail' 508 as shown in row 510. Similarly, accessibility test results associated with various UI elements are displayed the report 500. The report 500 displayed is merely exemplary, and various templates or custom reports may be used as applicable. The ID 'link 1' 504 is a hyperlink or a clickable link associated with the solution. When a user clicks or selects link to UI element such as 'ID link1' 504, the solution is displayed in a popup window corresponding UI element in the webpage as explained in FIG. 6.

FIG. 6 shows user interface 600 with results of accessibility test displayed, according to one embodiment. As explained in FIG. 5B, when a user clicks or selects a link in UI element ID in report 500, the corresponding UI element is highlighted in the webpage as shown in the user interface 600. If a solution corresponding to the element is available in the report 500, the solution is also displayed in the webpage in a popup window at a proximity to the UI element. For example, when the user clicks on link to UI element such as 'ID link1' 504 in the report 500 as shown in FIG. 5B, the UI element 'go' button is highlighted in the webpage as shown in 602, and solution A 604 corresponding to the UI element is displayed in the webpage. The ID 'link 1' is associated with the UI element. Thus user is provided with solutions to accessibility issues in runtime of web applications.

Figure 7:
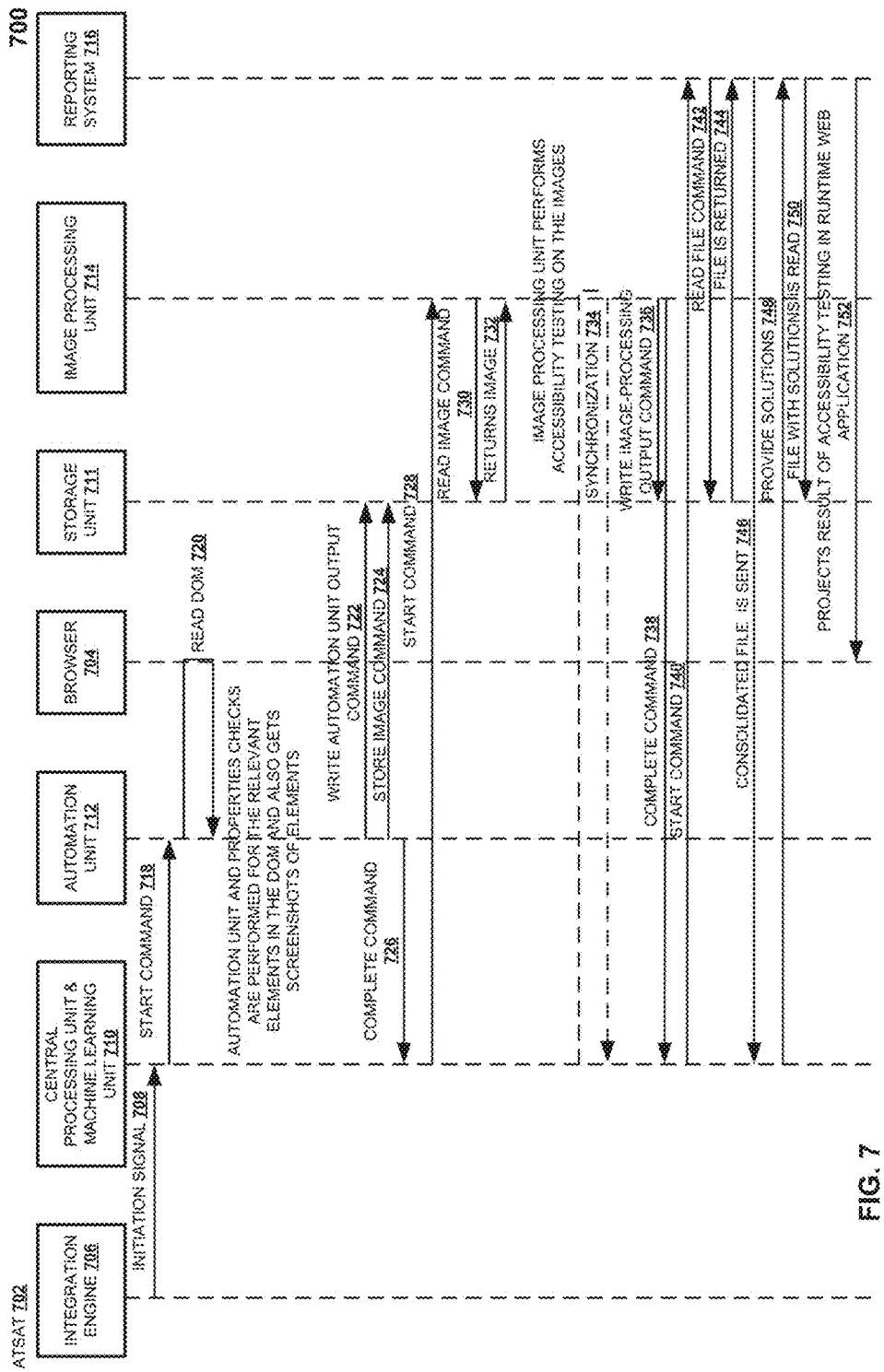
FIG. 7 is a sequence diagram illustrating accessibility testing software automation tool, according to one embodiment.

FIG. 7 is sequence diagram illustrating accessibility testing software automation tool, according to one embodiment. Accessibility testing software automation tool (ATSAT) 702 is a software tool or a plugin that can be integrated with browser 704 using integration engine 706. ATSAT is initiated for performing accessibility testing from the integration engine 706. An initiation signal or function call 708 is received at central processing unit 710. The central processing unit 710 maintains synchronization between automation unit 712, image-processing unit 714 and reporting system 716. The central processing unit 710 also contains machine-learning unit. The central processing unit 710 initiates a function in the automation unit 712 with start command 718. The automation unit 712 interacts with the browser 704 and obtains document object model (DOM) reference for the webpage by a function call read DOM 720. The automation unit 712 reads DOM elements, and analyses properties of the UI element to perform accessibility testing based on the accessibility rules. The automation unit 712 analyses the tag and the role properties of the UI elements in DOM to perform accessibility testing using accessibility rules. To perform accessibility testing, an accessibility rule may be used. Here, the automation unit checks for property in the DOM corresponding to the UI element to perform accessibility testing. Write automation unit output command 722 is used to store the result of the accessibility testing in a file in a storage unit 711.

The automation unit 712 generates the file and writes the result of accessibility testing in the file. Accessibility testing is performed on the individual UI elements, and the result of the accessibility testing is stored in the file. The automation unit 712 captures images or screen shots of the UI elements. The captured images are stored in the storage unit 711 when the command store image 724 is initiated. The automation unit 712 sends a complete command 726 to the central processing unit 710. The central processing unit 710 sends a start command 728 to image-processing unit 714 to start accessibility testing on the images based on accessibility rules. The image-processing unit 714 sends read image command 730 to the storage unit 711. In response to the received read image command 730, the storage unit 711 returns image 732 to the image-processing unit 714. The image-processing unit 714 may read images in a sequence or in parallel. The machine learning unit integrated with the central processing unit 710 enables processing the images further and provides processed information to the image processing unit 714. The synchronization 734 between the machine learning unit in the central processing unit 710 and the image-processing unit 714 is performed on a periodic basis. The synchronization 734 may include the image processing unit 714 providing information to the central processing unit and machine learning unit 710, the machine learning unit providing the result of processing the images to the image processing unit 714, etc. Image-processing unit 714 performs accessibility testing on the images based on accessibility rules. Result of the accessibility testing is written in the file and stored in the storage unit 711 based on write image-processing output command 736.

After performing the image processing on the images, the image-processing unit sends a complete command 738 to the central processing unit 710. The central processing unit 710 sends a start command 740 to the reporting system 716. The reporting system 716 sends read file command 742 to read the file stored in the reporting system 716. In response to the read file command 742, the file is returned 744 to the reporting system 716. The reporting system 716 consolidates the files in the storage unit 711. The consolidated file with results of accessibility testing on UI elements is sent 746 to the central processing unit to provide solutions to the accessibility issues for the UI elements that have failed accessibility tests. The consolidated file with solutions is stored in the storage unit 711. The file with solutions is read 750 by the reporting system 716. The reporting system 716 reads the file and projects the result of accessibility testing in runtime web application 752.

Figure 8:
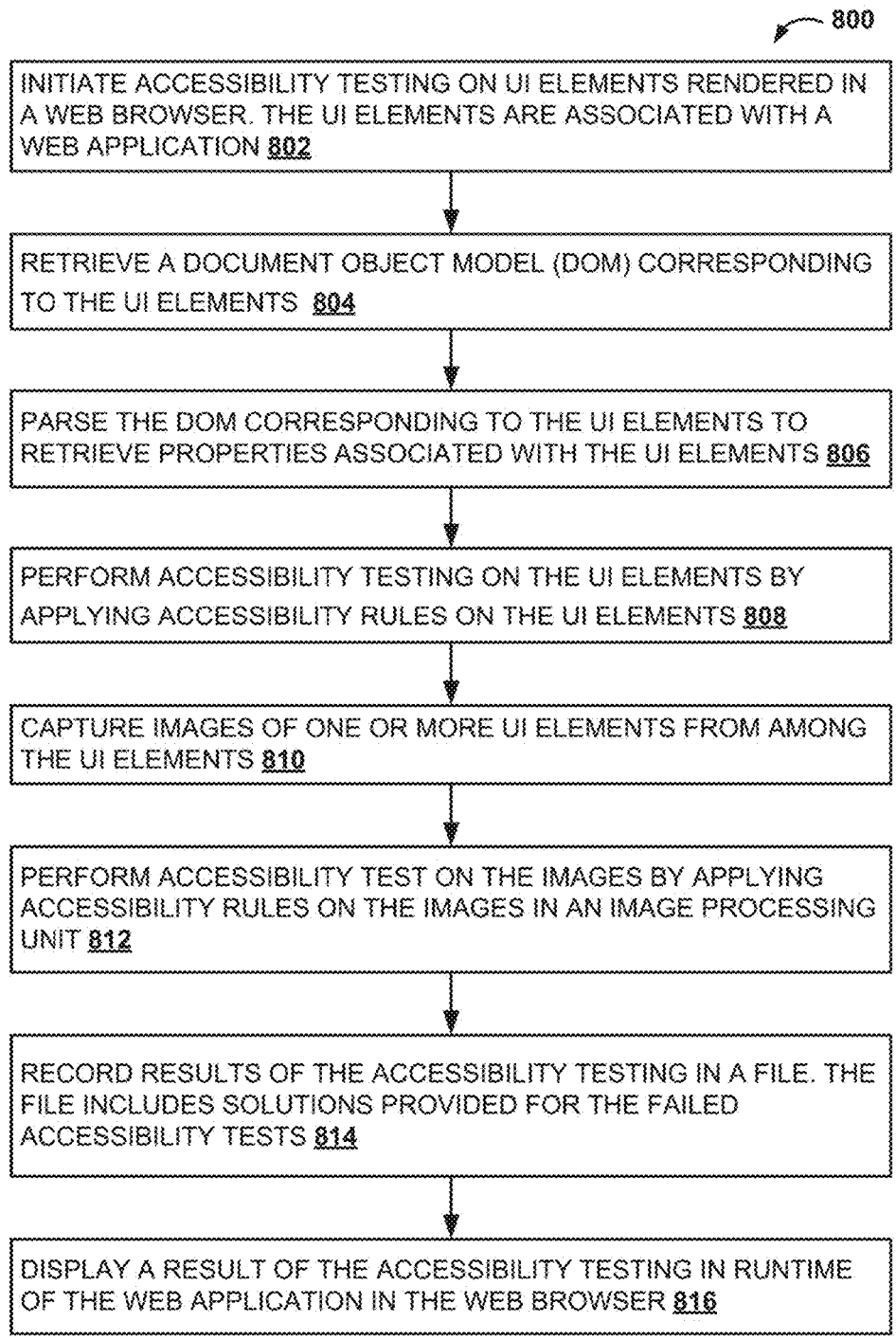
FIG. 8 is a flow chart, illustrating accessibility testing software automation tool, according to one embodiment.

FIG. 8 is flow chart illustrating process 800 of illustrating accessibility testing software automation tool, according to one embodiment. At 802, accessibility testing is initiated on UI elements rendered in a web browser. The UI elements are associated with a web application. At 804, a document object model (DOM) corresponding to the UI elements is retrieved. At 806, the DOM corresponding to the UI elements is parsed to retrieve properties associated with the UI elements. At 808, accessibility testing is performed on the UI elements by applying accessibility rules on the UI elements. At 810, images of one or more UI elements are captured from among the UI elements. At 812, accessibility test is performed on the images by applying accessibility rules on the images in an image-processing unit. At 814, a result of the accessibility testing is recorded in a file. The file includes solutions provided for the accessibility tests that have failed for the UI elements. At 816, the result of the accessibility testing is displayed in runtime of the web application in the web browser.

Some embodiments may include the above-described methods being written as one or more software components. These components, and the functionality associated with each, may be used by client, server, distributed, or peer computer systems. These components may be written in a computer language corresponding to one or more programming languages such as functional, declarative, procedural, object-oriented, lower level languages and the like. They may be linked to other components via various application programming interfaces and then compiled into one complete application for a server or a client. Alternatively, the components maybe implemented in server and client applications. Further, these components may be linked together via various distributed programming protocols. Some example embodiments may include remote procedure calls being used to implement one or more of these components across a distributed programming environment. For example, a logic level may reside on a first computer system that is remotely located from a second computer system containing an interface level (e.g., a graphical user interface). These first and second computer systems can be configured in a server-client, peer-to-peer, or some other configuration. The clients can vary in complexity from mobile and handheld devices, to thin clients and on to thick clients or even other servers.

The above-illustrated software components are tangibly stored on a computer readable storage medium as instructions. The term "computer readable storage medium" should be taken to include a single medium or multiple media that stores one or more sets of instructions. The term "computer readable storage medium" should be taken to include any physical article that is capable of undergoing a set of physical changes to physically store, encode, or otherwise carry a set of instructions for execution by a computer system which causes the computer system to perform any of the methods or process steps described, represented, or illustrated herein. Examples of computer readable storage medium include, but are not limited to: magnetic media, such as hard disks, floppy disks, and magnetic tape; optical media such as CD-ROMS, DVDs and holographic deices; magneto-optical media; and hardware devices that are specially configured to store and execute, such as application-specific integrated circuits (ASICs), programmable logic devices (PLDs) and ROM and RAM devices. Examples of computer readable instructions include machine code, such as produced by a compiler, and files containing higher-level code that are executed by a computer using an interpreter. For example, an embodiment may be implemented using Java®, C++, or other object-oriented programming language and development tools. Another embodiment may be implemented in hard-wired circuitry in place of, or in combination with machine readable software instructions.

FIG. 9 is a block diagram of an exemplary computer system 900. The computer system 900 includes a processor 905 that executes software instructions or code stored on a computer readable storage medium 955 to perform the above-illustrated methods. The computer system 900 includes a media reader 940 to read the instructions from the computer readable storage medium 955 and store the instructions in storage 910 or in random access memory (RAM) 915. The storage 910 provides a large space for keeping static data where at least some instructions could be stored for later execution. The stored instructions may be further compiled to generate other representations of the instructions and dynamically stored in the RAM 915. Me processor 905 reads instructions from the RAM 915 and performs actions as instructed. According to one embodiment, the computer system 900 further includes an output device 925 (e.g., a display) to provide at least some of the results of the execution as output including, but not limited to, visual information to users and an input device 930 to provide a user or another device with means for entering data and/or otherwise interact with the computer system 900. Each of these output devices 925 and input devices 930 could be joined by one or more additional peripherals to further expand the capabilities of the computer system 900. A network communicator 935 may be provided to connect the computer system 900 to a network 950 and in turn to other devices connected to the network 950 including other clients, servers, data stores, and interfaces, for instance. The modules of the computer system 900 are interconnected via a bus 945. Computer system 900 includes a data source interface 920 to access data source 960. The data source 960 can be accessed via one or more abstraction layers implemented in hardware or software. For example, the data source 960 may be accessed by network 950. In some embodiments the data source 960 may be accessed via an abstraction layer, such as a semantic layer.

A data source is an information resource. Data sources include sources of data that enable data storage and retrieval. Data sources may include databases, such as relational, transactional, hierarchical, multi-dimensional (e.g., OLAP), object oriented databases, and the like. Further data sources include tabular data (e.g., spreadsheets, delimited text files), data tagged with a markup language (e.g., XML data), transactional data, unstructured data (e.g., text files, screen scrapings), hierarchical data (e.g., data in a file system, XML data), files, a plurality of reports, and any other data source accessible through an established protocol, such as Open Data Base Connectivity (ODBC), produced by an underlying software system (e.g., ERP system), and the like. Data sources may also include a data source where the data is not tangibly stored or otherwise ephemeral such as data streams, broadcast data, and the like. These data sources can include associated data foundations, semantic layers, management systems, security systems and so on.

In the above description, numerous specific details are set forth to provide a thorough understanding of embodiments. One skilled in the relevant art will recognize, however that the embodiments can be practiced without one or more of the specific details or with other methods, components, techniques, etc. In other instances, well-known operations or structures are not shown or described in detail.

Although the processes illustrated and described herein include series of steps, it will be appreciated that the different embodiments are not limited by the illustrated ordering of steps, as some steps may occur in different orders, some concurrently with other steps apart from that shown and described herein. In addition, not all illustrated steps may be required to implement a methodology in accordance with the one or more embodiments. Moreover, it will be appreciated that the processes may be implemented in association with the apparatus and systems illustrated and described herein as well as in association with other systems not illustrated.

The above descriptions and illustrations of embodiments, including what is described in the Abstract, is not intended to be exhaustive or to limit the one or more embodiments to the precise forms disclosed. While specific embodiments of, and examples for, the one or more embodiments are described herein for illustrative purposes, various equivalent modifications are possible within the scope, as those skilled in the relevant art will recognize. These modifications can be made in light of the above detailed description. Rather, the scope is to be determined by the following claims, which are to be interpreted in accordance with established doctrines of claim construction.

What is claimed is:

1. A non-transitory computer-readable medium to store instructions, which when executed by a computer, cause the computer to perform operations comprising:
    initiating accessibility testing on User Interface (UI) elements rendered in a web browser, wherein the UI elements are associated with a web application;
    retrieving a document object model (DOM) corresponding to the UI elements;
    performing accessibility testing on the UI elements by applying accessibility rules to the DOM corresponding to the UI elements;
    displaying a result of the accessibility testing in runtime of the web application in the web browser;
    receive a user input on a hyper link corresponding to a UI element in a visual representation in the web browser;
    in response to the user input, display a solution for the UI element at a proximity to the UI element in runtime of the web application, wherein the solution for the UI element is provided by a machine learning unit while performing accessibility testing, and wherein the solution is provided for a failed accessibility test for the UI element; and
    record the solution for the UI element in a file.

2. The computer-readable medium of claim 1, further comprises instructions which when executed by the computer further cause the computer to:
    parse the DOM corresponding to the UI elements to retrieve properties associated with the UI elements; and
    apply the accessibility rules to the properties associated with the UI elements record the result of the accessibility testing in the file.

3. The computer-readable medium of claim 2, further comprises instructions which when executed by the computer further cause the computer to:
    capture images of one or more UT elements from among the UI elements;
    perform accessibility test on the images by applying accessibility rules on the images in an image-processing unit;
    record the result of the accessibility testing in the file: and
    display the file as a report with a visual representation in the web browser.

4. The computer-readable medium of claim 1, wherein the accessibility testing is performed by an accessibility testing software automation tool provided as a plugin in the web browser.

5. The computer-readable medium of claim 4, further comprises instructions which when executed by the computer further cause the computer to:
    integrate an UI automation tool with the accessibility testing software automation tool;
    simulate navigation to the UI elements rendered in the web browser; and
    perform accessibility testing on the UI elements by applying accessibility rules on the UI elements.

6. A computer-implemented method of accessibility testing, the method comprising:
    initiating accessibility testing on User Interface (UI) elements rendered in a web browser, wherein the UI elements are associated with a web application;
    retrieving a document object model (DOM) corresponding to the UI elements;
    perform accessibility testing on the UI elements by applying accessibility rules to the DOM corresponding to the UI elements;
    displaying a result of the accessibility testing in runtime of the web application in the web browser;
    receiving a user input on a hyper link corresponding to a UI element in a visual representation in the web browser;
    in response to the user input, displaying a solution for the UI element at a proximity to the UI element in runtime of the web application, wherein the solution for the UI element is provided by a machine learning unit while performing accessibility testing, and wherein the solution is provided for a failed accessibility test for the UI element; and
    recording the solution for the UI element in a file.

7. The method of claim 6, further comprising:
    parsing the DOM corresponding to the UI elements to retrieve properties associated with the UI elements; and
    applying the accessibility rules to the properties associated with the UI elements record the result of the accessibility testing in the file.

8. The method of claim 7, further comprising:
    capturing images of one or more UI elements from among the UI elements;
    performing accessibility test on the images by applying accessibility rules on the images in an image-processing unit;
    recording the result of the accessibility testing in the file; and
    displaying the file as a report with a visual representation in the web browser.

9. The method of claim 6, wherein the accessibility testing is performed by an accessibility testing software automation tool provided as a plugin in the web browser.

10. The method of claim 6, further comprising:
    integrating an UI automation tool with the accessibility testing software automation tool;
    simulating navigation to the UI elements rendered in the web browser; and
    performing accessibility testing on the UI elements by applying accessibility rules on the UI elements.

11. A computer system for accessibility testing software automation tool, comprising:
    a computer memory to store program code; and
    a processor to execute the program code to:
        initiate accessibility testing on User Interface (UI) elements rendered in a web browser, wherein the UI elements are associated with a web application;
        retrieve a document object model (DOM) corresponding to the UI elements at an automation unit;

perform accessibility testing on the UI elements by applying accessibility rules to the DOM corresponding to the UI elements;

display a result of the accessibility testing in runtime of the web application in the web browser;

receive a user input on a hyper link corresponding to a UI element in a visual representation in the web browser;

in response to the user input, display a solution for the UI element at a proximity to the UI element in runtime of the web application, wherein the solution for the UI element is provided by a machine learning unit while performing accessibility testing, and wherein the solution is provided for a failed accessibility test for the UI element; and record the solution for the UI element in a file.

12. The system of claim 11, wherein the processor further executes the program code to:

parse the DOM corresponding to the UI elements to retrieve properties associated with the UI elements; and apply the accessibility rules to the properties associated with the UI elements record the result of the accessibility testing in the file.

13. The system of claim 12, wherein the processor further executes the program code to:

capture images of one or more UI elements from among the UI elements;

perform accessibility test on the images by applying accessibility rules on the images in an image-processing unit;

record the result of the accessibility testing in the file; and display the file as a report with a visual representation in the web browser.

14. The system of claim 11, wherein the processor further executes the program code to:

integrate an UI automation tool with the accessibility testing software automation tool:

simulate navigation to the UI elements rendered in the web browser; and perform accessibility testing on the UI elements by applying accessibility rules on the UI elements.

* * * * *

UNITED STATES PATENT AND TRADEMARK OFFICE
CERTIFICATE OF CORRECTION

PATENT NO. : 10,275,339 B2
APPLICATION NO. : 15/668722
DATED : April 30, 2019
INVENTOR(S) : Jai Vignesh R Page 1 of 1

It is certified that error appears in the above-identified patent and that said Letters Patent is hereby corrected as shown below:

On the Title Page

(72) Inventor:
Replace Inventor "Jai VIGNESH R" with --- Jai Vignesh R ---

Signed and Sealed this
Twenty-ninth Day of June, 2021

Drew Hirshfeld
*Performing the Functions and Duties of the*
*Under Secretary of Commerce for Intellectual Property and*
*Director of the United States Patent and Trademark Office*